United States Patent [19]

Nicholson

[11] 4,189,819

[45] Feb. 26, 1980

[54] METHOD OF MANUFACTURING METALLIC SPIRALLY WOUND GASKETS

[75] Inventor: Terence P. Nicholson, Derwentside, England

[73] Assignee: Corru-Seals Inc., North Haven, Conn.

[21] Appl. No.: 939,963

[22] Filed: Sep. 6, 1978

[30] Foreign Application Priority Data

Jan. 31, 1978 [GB] United Kingdom ............... 3911/78

[51] Int. Cl.² ............................................. B23P 17/00
[52] U.S. Cl. ................................... 29/417; 29/455 R; 29/469; 29/DIG. 34; 228/141.1; 277/204
[58] Field of Search ............. 29/163.5 F, 455 R, 446, 29/469, 428, 417, DIG. 34; 277/204; 228/141.1

[56] References Cited

U.S. PATENT DOCUMENTS

| 816,478 | 3/1906 | Kirschning | 277/204 |
|---|---|---|---|
| 1,942,703 | 1/1934 | Hubbard et al. | 277/204 |
| 2,027,299 | 1/1936 | Bohmer et al. | 277/204 |
| 3,302,066 | 1/1968 | Cooper | 29/417 X |
| 3,466,733 | 9/1969 | Pajak et al. | 29/163.5 F X |
| 3,905,090 | 9/1975 | Painter | 29/455 R |

FOREIGN PATENT DOCUMENTS

| 988769 | 5/1951 | France | 228/141.1 |
|---|---|---|---|
| 528385 | 10/1940 | United Kingdom | 29/163.5 F |

*Primary Examiner*—Charlie T. Moon

[57] ABSTRACT

For manufacturing a metallic spirally wound gasket having an outer centring ring it is proposed spirally to coil a corrugated strip of metallic material to form a sealing element of desired diameter and to surround the thus formed sealing element with a centring ring which is or has been formed by spirally coiling a metal strip which is of greater thickness than the sealing element strip and has a corrugated cross-section such that adjacent turns of the spiral fit without clearance one against the other.

4 Claims, 13 Drawing Figures

METHOD OF MANUFACTURING METALLIC SPIRALLY WOUND GASKETS

This invention relates to the manufacture of metallic spirally wound gaskets such as are used for instance to seal the joints between abutting pipe sections.

Spirally wound gaskets are manufactured to a number of specifications, but for descriptive purposes reference is made to that of British Standard Specification No. 3381, 1961 and 1973, which refers to a spirally wound metallic gasket which generally has an outer centring ring and occasionally an inner ring as well.

The centring ring has two purposes:
1. It accurately locates the spiral wound gasket; and
2. It prevents the gasket from being over compressed; and it is usually manufactured from carbon steel because of cost.

The Inner Ring also has two purposes:
1. It fills the cavity between the bore of the flanges and the gasket, and this prevents turbulence and build up of unwanted materials; and
2. It protects the gasket from the environment in which it is working.

In most cases the inner ring is manufactured from Stainless Steel and occasionally in Titanium, carbon steel and so forth.

Both rings are cut from sheet and machined on their inside and outside edges. The centring ring has a groove machined on its inside edge for the corrugation of the spiral gasket to fit in. In turn the inner rings are chamfered on both outside edges for fitting into the corrugation on the inside of the gasket.

This method of manufacture is however extremely wasteful both in material and man hours of work.

The general object of the present invention is to provide an improved method of manufacture which reduces wastefullness to an absolute minimum without loss in efficiency and which at the same time substantially reduces the cost of the finished product.

In accordance with the present invention therefore a method of manufacturing a metallic spirally wound gasket having an outer centring ring comprises spirally coiling a corrugated strip of metallic material to form a sealing element of desired diameter and surrounding the thus formed sealing element with a centring ring which is or has been formed by spirally coiling a metal strip which is of greater thickness than the sealing element strip and has a corrugated cross-section such that adjacent turns of the spiral fit, without clearance, one against the other. Preferably the sealing element strip and the centring ring strip are made of stainless steel.

Further in accordance with the invention, a method as aforesaid is characterised in that the radially outermost end of the sealing element after being welded to its next radially innermost turn or turns is severed so as to provide a terminal portion to which there is secured by welding a chamfered end portion of the said centring ring strip whereafter the latter is tightly and evenly spirally coiled until the desired diameter is attained whereafter the strip is cut and secured to its adjacent radially inward spiral coil.

Still further in accordance with the invention and for the manufacture of a metallic spirally wound gasket with both a centring ring and an inner ring the methods as above defined are further characterised in that after the sealing element has been coiled and secured there is fitted therein an inner ring which has been formed by spirally coiling a metallic strip which is of corrugated cross-section and reduced thickness compared with the strip of the sealing element.

The nature of the present invention should however become more clearly apparent from the following description with reference to the accompanying drawngs in which.

Figure 1:
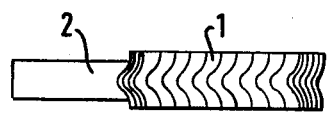
FIGS. 1 and 2 are radial sections through a typical known spirally wound gasket with a centring ring only, and with a centring ring and an inner ring respectively.

Referring firstly to FIG. 1 there is shown in radial cross-section a known form of gasket having a coiled sealing element 1 and a surrounding centring ring 2. The sealing element 1 may be made of various alloys not including stainless steel whilst the centring ring is made of carbon steel.

Figure 2:
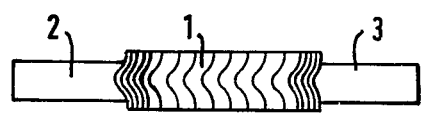

FIG. 2 similarly shows a combined sealing element 1 and centring ring 2 with however the addition of an inner ring 3. The centring ring 2 and inner ring 3 have been cut from sheet material.

By contrast, it is of the essence of the present invention that the centring ring and the inner ring, if one is required, should be formed by the spiral coiling of metallic strip material—preferably stainless steel—which has been formed by rolling, pressing or drawing, to a predetermined cross-section as hereafter explained.

In a preferred mode of performance of the invention, the spirally wound gasket or sealing element is coiled to the desired diameter and the last turns multi-resistance welded as may be specified. The stainless steel strip of the gasket is not however cut off near the weld, but a short distance away—say 2".

This surplus end is then attached by welding or brazing to the end of a thicker stainless steel strip. Coiling then continues until the desired diameter has been attained. It is then welded and the surplus material cut off close to the weld. The end is dressed and the ring then only requires identification, packing etc.

The profile of the strip material for the centring ring is of critical importance. For instance, if it was only a plain strip of rectangular cross-section the gasket could not only just slip out or flip out, but also seriously injure someone in the process.

Consequently it is absolutely essential that the cross-section of the strip should be both truly and firmly interlocking, and it must also be perfectly solid when coiled to ensure that it does not collapse when compressed.

Figure 3A:
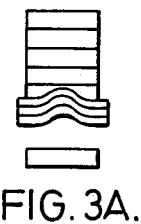
FIGS. 3A, 3B, 3C and 3D show various possible cross-sections for a metallic strip intended to form a centring ring.
Figure 3B:
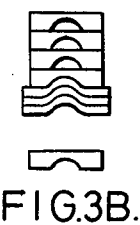
Figure 3C:
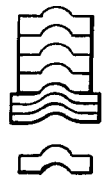
Figure 3D:
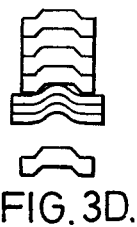

FIGS. 3A, 3B, 3C and 3D illustrate four different and possible cross-sectional profiles for the strip material of which however only 3C and 3D are satisfactory. The profile shown in FIG. 3D is however preferred to that of FIG. 3C because in practice it has been found to have the advantage that the strip does not slip into the grooves of threads formed on bolts or studs connecting the pipe flanges with which the gasket and centring ring would be used.

Figure 4A:
FIGS. 4A and 4B illustrate two unsuitable metallic strip profiles.
Figure 4B:
Figure 4C:
FIGS. 4C and 4D illustrate two suitable metallic strip profiles.
Figure 4D:

It is however of critical importance that the cross-section of the metallic strip should be such that adjoining coils nest into one another snugly as indicated in FIGS. 4C and 4D thereby becoming in effect one integral piece of metal. The metallic strip cross-sections shown in FIGS. 4A and 4B, which are of uniform cross-section, cannot nest into one another without the formation of a gap. This imparts a sponginess or resilience to the coiled strip and prevents it from operating as it is intended—that is to say as a compression control ring.

By contrast the metallic strips shown in FIGS. 4C and 4D are of non-uniform cross-section, the sloping side portions of the central trough being thinner than the co-planar end portions.

Figure 5A:
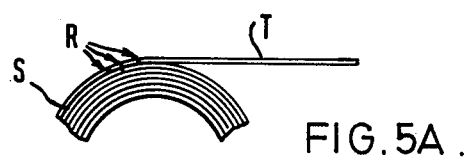
FIGS. 5A, 5B and 5C illustrate the mode of attaching a sealing element metallic strip to a centring ring metallic strip.
Figure 5B:
Figure 5C:
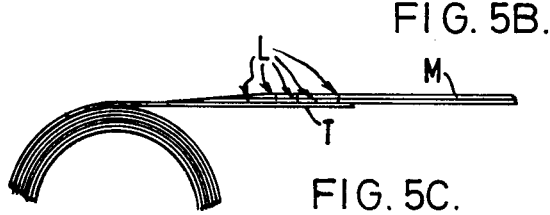

In practice, the spirally wound curved profile gasket strip S, as shown in FIG. 5A is wound to size, resistance welded at three points R and cut off from the main coil of raw material a short distance—of the order of 2 inches—from the weld to form a terminal portion T. Next, the end of the thicker metallic strip M having the cross-sectional profile shown in FIGS. 3D and 4D is chamfered, as shown in FIG. 5B, to facilitate coiling. Then as shown in FIG. 5C the terminal portion T of the strip of the gasket is fitted to the underside of the strip M and resistance welded at several locations L.

It is essential that tension should be constantly applied to the strip M to ensure that it is not only coiling evenly on the gasket, but also forcing the sectioned strip so tightly together that to all intents and purposes it would appear as if it had been cut from solid sheet material. Then coiling begins and continues until the desired diameter has been reached.

While maintaining the tension the centring ring is rotated to a position where it can be clamped prior to cutting. After cutting, the short loose end of the strip on the ring can easily be pressed down and welded to the previous coil.

The ring is then removed from the coiling machine and the end of the coil welded further if necessary and neatly dressed.

Identification marks are stamped on the centring ring, and it is plated, painted, oiled or otherwise treated, to prevent oxidation of the carbon steel wire during storage or in use.

It has been found in practice, particularly with larger diameter rings, that the savings are so great that the heavy strip used for the centring ring can be made from stainless steel thereby making anti-oxidation treatments wholly unnecessary.

The fitting of an Inner ring differs in as much as whereas the heavy strip of the centring ring is actually attached to the stainless steel of the spirally wound gasket before coiling commences, when it comes to the inner ring this is not possible. Basically speaking the inner ring, although coiled from wire of predetermined cross-section, is best if it is manufactured as an individual item and then fitted into the centre of the spiral wound gasket.

Regarding the cross-section of the material for the inner ring, there literally is no choice. It has to be as shown in FIG. 3C and as the inner rings are in most cases much narrower radially than the centring ring it becomes necessary to use a formed material of much thinner section. This is also very necessary, otherwise the rings just cannot be manufactured to within reasonable tolerance.

The actual manufacture of the inner ring presents no problems, providing that sufficient tension is kept on the strip during coiling to ensure that the finished ring is really solid.

Although as above described it may be preferable for the centring ring to be physically attached to the spiral wound gasket, there is nothing to prevent it from being manufactured as a separate unit similar to the inner ring. It is purely a matter of convenience.

I claim:

1. A method of manufacturing a metallic spirally wound gasket having an outer centring ring which comprises the steps of spirally coiling a corrugated strip of metallic material to form a sealing element of desired diameter, and surrounding the thus formed sealing element with a centring ring which is or has been formed by spirally coiling a metal strip which is of greater thickness than the sealing element strip and has a corrugated cross-section such that adjacent turns of the spiral sealing element and centring ring fit, without clearance one against the other.

2. A method in accordance with claim 1 in which the sealing element strip and the centring ring strip are made of stainless steel.

3. A method in accordance with claim 1 or claim 2 characterised in that the radially outermost end of the sealing element after being welded to its next radially innermost turn or turns is severed so as to provide a terminal portion to which there is secured by welding a chamfered end portion of the said centring ring strip whereafter the latter is tightly and evenly spirally coiled until the desired diameter is attained whereafter the strip is cut and secured to its adjacent radially inward spiral coil.

4. A method in accordance with claim 1 or 2 for the manufacture of a metallic spirally wound gasket with both a centring ring and an inner ring characterised further in that after the sealing element has been coiled and secured there is fitted therein an inner ring which has been formed by spirally coiling a metallic strip which is of corrugated cross-section and reduced thickness compared with the strip of the sealing element.

* * * * *